(12) United States Patent
Graham (10) Patent No.: US 10,827,761 B1
(45) Date of Patent: Nov. 10, 2020

(54) COLLAPSIBLE FISH FILLETING STATION SYSTEMS

(71) Applicant: Robert Graham, Dallas, GA (US)

(72) Inventor: Robert Graham, Dallas, GA (US)

( * ) Notice: Subject to any disclaimer, the term of this patent is extended or adjusted under 35 U.S.C. 154(b) by 0 days.

(21) Appl. No.: 16/532,007

(22) Filed: Aug. 5, 2019

(51) Int. Cl.
*A22C 25/06* (2006.01)
*A47B 5/06* (2006.01)

(52) U.S. Cl.
CPC ............. *A22C 25/06* (2013.01); *A47B 5/06* (2013.01)

(58) Field of Classification Search
CPC ......... A22C 25/00; A22C 25/06; A22C 25/02; A22C 25/17
USPC ........................................ 452/185, 194, 195
See application file for complete search history.

(56) References Cited

U.S. PATENT DOCUMENTS

| | | | |
|---|---|---|---|
| 3,503,094 A * | 3/1970 | Kennedy | A22C 25/025 452/195 |
| 3,590,423 A | 7/1971 | Messer | |
| 3,908,231 A * | 9/1975 | Price | A22C 25/06 452/195 |
| 5,098,338 A | 3/1992 | Jensen | |
| 6,254,473 B1 | 7/2001 | Shore et al. | |
| 6,554,691 B1 | 4/2003 | Schauls | |
| 6,855,049 B2 | 2/2005 | Richardson et al. | |
| 2005/0130575 A1* | 6/2005 | Kallas | A22C 25/06 452/195 |
| 2012/0190286 A1* | 7/2012 | Redford | A22C 25/16 452/195 |

* cited by examiner

*Primary Examiner* — Richard T Price, Jr.
(74) *Attorney, Agent, or Firm* — Runyan Law; Charles Runyan (57) ABSTRACT

A collapsible fish filleting station system that relates generally to the field of work-tables and more specifically relates to fish-holding and auxiliary devices in connection with work-tables. The collapsible fish filleting station includes a cutting board comprising a rigid, substantially rectangular, panel and a support assembly configured to support the cutting board in a stable working position over the gunwale of a boat.

20 Claims, 5 Drawing Sheets

COLLAPSIBLE FISH FILLETING STATION SYSTEMS

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. FIELD OF THE INVENTION

The present invention relates generally to the field of cutting-boards and more specifically relates to collapsible fish filleting stations.

2. DESCRIPTION OF RELATED ART

A cutting board is a surface used for placing materials for cutting operations. Most commonly, cutting boards are used for preparing food. Cutting boards are generally made of materials resistant to cutting so that they may be used repeatedly. However, cutting boards must not be so hard that they damage cutting implements. Often, a specialized cutting board may be desired for use with a specific activity. However, cutting boards are often designed for stationary and multipurpose uses, and may not be optimal for a potential task. In particular, cutting boards require an existing table or other surface to support the cutting operation. A significant issue for mobile tasks includes an inability to secure the cutting board to a workspace where a flat supporting surface is not available. Additionally, suitably sized cutting boards may be too large or unwieldly to warrant storing a variety of stations for each task. It is common practice in many regions for sport fishermen to clean and fillet their catch while on the boat. Unfortunately, most boats used by sport fishermen have no accommodations for cleaning fish. For example, the gunwales of most sport-fishing boats are too narrow to support a cutting board in a stable position during cleaning and filleting. Many fishermen must improvise, using methods that are less than ideal. Some use the top of a cooler located within the boat while others attempt to balance a cutting-board or tray on the gunwale. Most improvised methods are messy and inconvenient. Clearly, a need exists for an improved system for use on a boat.

Various attempts have been made to solve problems found in the cutting-board art, for example, U.S. Pat. No. 3,590,423 to Thomas Messer relates to a cleaning apparatus for fish. The described cleaning apparatus for fish includes a cleaning apparatus for fish and which apparatus may be attached to the gunwale of a small fishing boat. The apparatus comprises a rack having a wide, open top and a small or narrow, open bottom. It is possible to clean the fish so as to allow the waste products to fall through the narrow, open bottom. However, the narrow, open bottom prevents the fish from falling through and out of the rack. In addition, there may be placed a tray on top of the rack. The tray provides a working platform for cleaning small fish. The waste products of the small fish may be pushed outside of the tray so as to fall into the water. Further, the tray provides a working platform for cutting up fish and other materials to use as bait while fishing. When the rack and tray are no longer needed in the fishing trip, the tray may be removed from the rack and washed in the water. Then, the rack may be removed from the gunwale of the boat and washed in the water. Then, the rack and tray may be stored until needed on the next fishing trip. Unfortunately, the above-referenced patent fails to provide a system that is adjustable to accommodate gunwales of varying configuration or is adaptable to use on shore, as is describe below in the system as claimed. Thus, a need exists for a reliable collapsible fish filleting station, and to avoid the above-mentioned problems.

BRIEF SUMMARY OF THE INVENTION

In view of the foregoing disadvantages inherent in the known cutting-board art, the present disclosure provides novel collapsible fish filleting station systems. The general purpose of the present disclosure, which will be described subsequently in greater detail, is to provide a system relating generally to the field of work-tables and more specifically relating to fish-holding and auxiliary devices in connection with work-tables.

A collapsible fish filleting station for assisting the cleaning and filleting of a fish adjacent a gunwale of a boat is disclosed herein. The collapsible fish filleting station includes a cutting board comprising a rigid, substantially rectangular, panel having an upper working surface, a bottom surface, opposing sides, and opposing ends, a support assembly configured to support the cutting board in a stable working position over the gunwale, the support assembly including a first guide rail mounted to the bottom surface in an orientation substantially perpendicular to the opposing sides, a first inboard leg slidably engaged with the first guide rail, the first inboard leg adjustable along the first guide rail to engage an inboard surface of the gunwale during use, a first outboard leg slidably engaged with the first guide rail, the first outboard leg adjustable along the first guide rail to engage an outboard surface of the gunwale during use, a second guide rail mounted to the bottom surface, the second guide rail arranged in a parallel and spaced apart relationship with the first guide rail, a second inboard leg slidably engaged with the second guide rail, the second inboard leg adjustable along the second guide rail to engage the inboard surface of the gunwale during use, and a second outboard leg slidably engaged with the second guide rail, the second outboard leg adjustable along the second guide rail to engage the outboard surface of the gunwale during use; and a spring-actuated holding clip mounted to the upper working surface, the spring-actuated holding clip configured to hold the fish on the upper working surface during use.

A method of making a collapsible fish filleting station is also disclosed herein. The method of making a collapsible fish filleting station may comprise the steps of: providing a cutting board comprising a rigid, substantially rectangular, panel may have an upper working surface, a bottom surface, opposing sides, and opposing ends; mounting a first guide rail to the bottom surface in an orientation substantially perpendicular to the opposing sides; slidably engaging a first inboard leg with the first guide rail in an arrangement enabling the first inboard leg to be adjustable along the first guide rail to engage an inboard surface of the gunwale; slidably engaging a first outboard leg with the first guide rail in an arrangement enabling the first outboard leg to be adjustable along the first guide rail to engage an outboard surface of the gunwale; mounting a second guide rail to the bottom surface in a parallel and spaced apart relationship with the first guide rail; slidably engaging a second inboard leg slidably with the second guide rail in an arrangement enabling the second inboard leg to be adjustable along the second guide rail to engage the inboard surface of the gunwale; slidably engaging a second outboard leg with the second guide rail in an arrangement enabling the second outboard leg adjustable along the second guide rail to engage the outboard surface of the gunwale; providing a pivot hinge within each one of the first inboard leg, the first outboard leg, the second inboard leg, and the second outboard leg, the pivot hinge enabling the first inboard leg, the first outboard leg, the second inboard leg, and the second outboard leg to pivot between at least one deployed orientation extending outwardly from the bottom surface and a stowed orientation extending generally parallel to the bottom surface; and mounting a holding clip to the upper working surface, the holding clip configured to securely hold the fish on the upper working surface during such cleaning.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a collapsible fish filleting station system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to cutting-boards and more particularly to collapsible fish filleting station systems as used to improve the art of collapsible fish filleting.

Generally, the present system provides a portable folding station which may be used on either a boat or a flat surface. The present system is superior to other systems in that it effectively provides a mobile fish filleting station usable in multiple configurations. The present system provides a collapsible fish filleting station useful for providing a surface for cleaning fish while in a boat. The device may comprise a small table or plank about 24-inches long that can be attached to the side of a boat or set up on shore for the purpose of cleaning and filleting fish on the water instead of taking the fish elsewhere, like home and having to deal with fish guts, bad odor, etc. The plank is portable and has a clamp on one end to hold the head of the fish, while cleaning and cutting. The pluck can be discarded right into the water after cleaning so that all that remains is meat to take home. The plank can also be set up on shore with included legs underneath the unit.

In one embodiment of the present system, the collapsible fish filleting station assembly includes a rectangular plastic board, four elongated attachment members for supporting the board, a pair of braced slide rails for attaching the elongated attachment members to the board, lockable hinges for providing articulation to the attachment members, buttons for disengaging the lockable hinges, and a clamping mechanism for manually securing the attachment members to a support structure. The attachment members may include a set of collapsible legs. The collapsible legs function both as support legs and together form the clamping mechanism used to clamp the device to a support structure, such as a gunwale of the boat. The collapsible leg of the assembly may include pads to assist in gripping surfaces of the gunwale when the legs are pushed close together to clamp down on the side of the boat. A metal brace may be used to mount the collapsible leg assembly to the bottom of the product. The braced slide rails function as a locking and unlocking path for the legs to slide along in order to clamp down on the gunwale. The collapsible legs may extend telescopically to various projecting lengths. The braced slide rails include a leg mount and locking slides to hold the legs in place on the horizontal axis and are used to slide and lock the leg system along the slide rails. A locking button may be provided that is pressed in to extend or stow the legs. The longitudinal plank may include a rough surface to grip the fish that lays on top of it.

A spring-loaded fish clamp may be mounted on the top of the product to assist in holding the fish in place while it is on the board. The station may be constructed of water-resistant, easy-to-clean materials so that the station may be washed by immersing it in a body of water. In an attached configuration, the station attachment members may provide secure support to the station sufficient for using the station as a working surface, particularly for filleting a fish. The legs extend over the edges of a boat gunwale to provide a secure mounting means, which will not move in relation to the boat during movement. The legs may be manually adjusted to clamp to or under the gunwale. Alternatively, the legs may be adapted for securing to other support structures, such as branches, fences, or other structures. The adaptability of the legs allows the filleting station to be used in other fishing situations when the user is not in a boat, such as on a riverbank or the shore of a lake. In use, the collapsible cleaning station is oriented so that the surface of the station plank lies flat, providing a surface for filleting a fish. The fish may be lain on the surface of the station. Optionally, the integrated clip may be used to securely attach the fish to the station surface.

Figure 1:
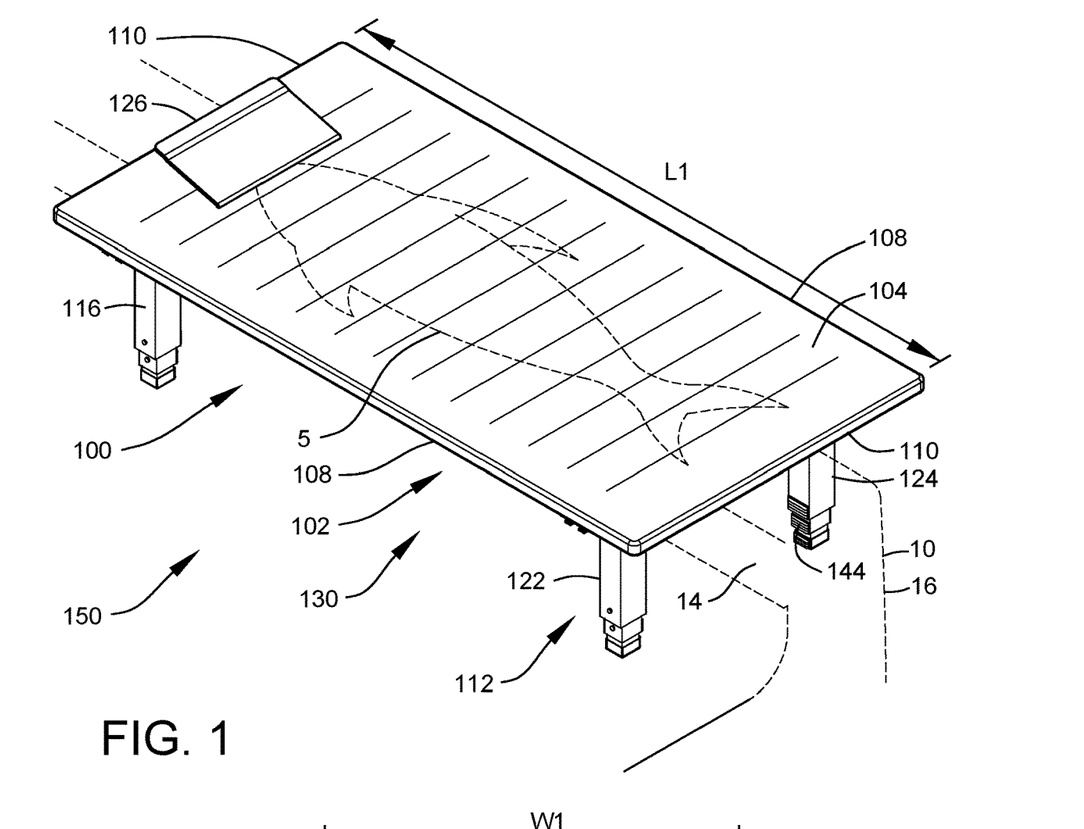
FIG. 1 is a top perspective view of the collapsible fish filleting station during an 'in-use' condition, according to an embodiment of the disclosure.
Figure 2:
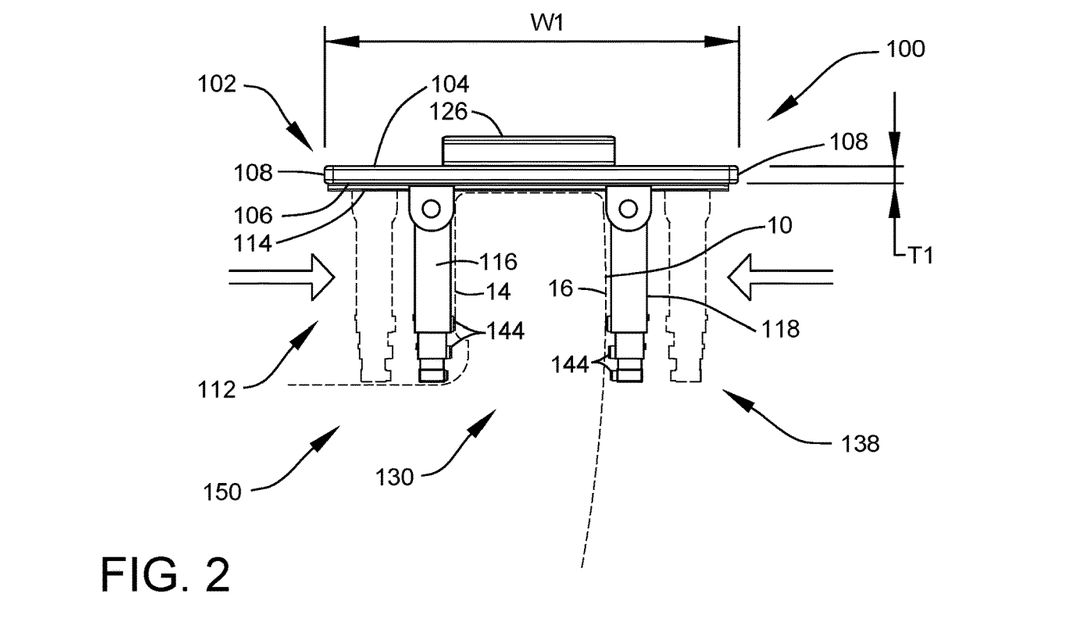
FIG. 2 is an end view of the collapsible fish filleting station of FIG. 1, illustrating adjustment of the device, according to an embodiment of the present disclosure.
Figure 3:
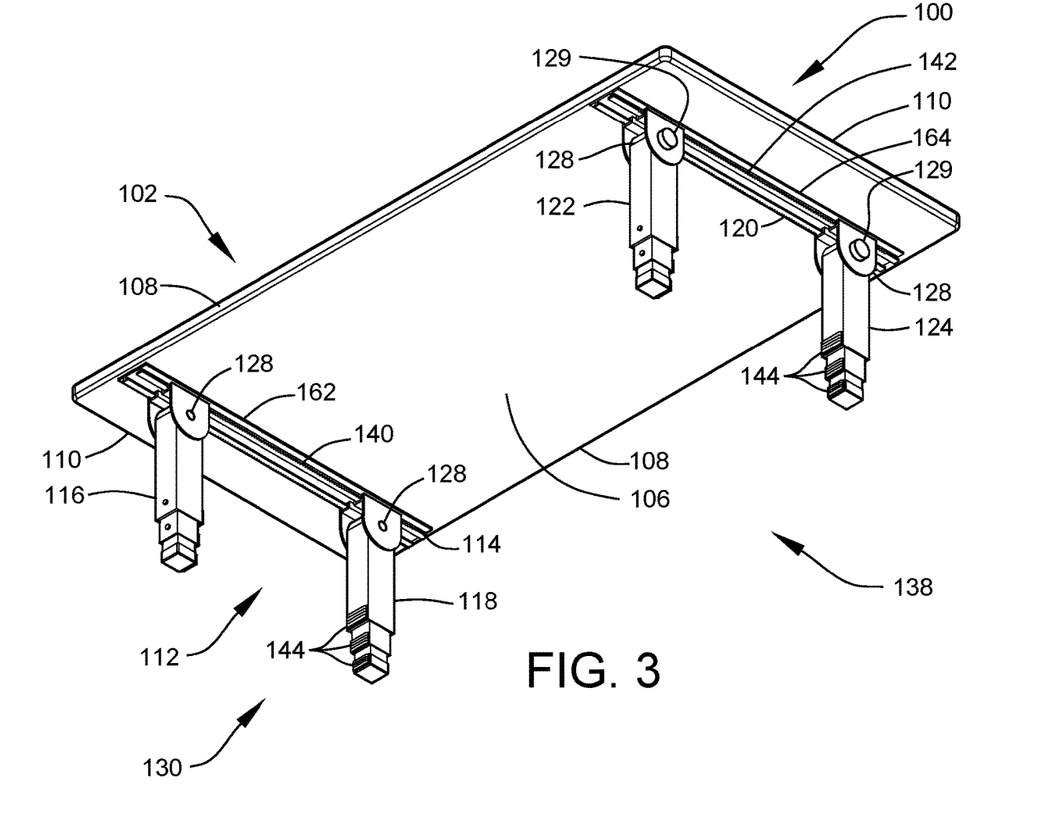
FIG. 3 is a bottom perspective view of the collapsible fish filleting station of FIG. 1, according to an embodiment of the present disclosure.

Referring now more specifically to the drawings by numerals of reference, there is shown in FIGS. 1-8, various views of a collapsible fish filleting station 100. FIG. 1 shows a collapsible fish filleting station 100 during an 'in-use' condition 150, according to an embodiment of the present disclosure. As noted above, the collapsible fish filleting station 100 may be used to assist in the cleaning and filleting of a fish 5 adjacent a gunwale 10 of a boat. FIG. 2 is an end view of the collapsible fish filleting station 100 of FIG. 1, illustrating adjustment of the device, according to an embodiment of the present disclosure. FIG. 3 is a bottom perspective view of the collapsible fish filleting station 100 of FIG. 1, according to an embodiment of the present disclosure.

As illustrated, the collapsible fish filleting station 100 may include a cutting board 102 comprising a rigid, substantially rectangular, panel having an upper working surface 104, a bottom surface 106, opposing sides 108, and opposing ends 110, as shown.

The upper working surface 104 of the cutting board 102 may include a rough texture to assist in holding the fish 5 on the upper working surface 104 during cleaning and filleting. A spring-actuated holding clip 126 may be mounted to the upper working surface 104 to further assist in holding the fish 5 in place during use. The cutting board 102 may be constructed of water-resistant, easy-to-clean materials so that the station may be washed by immersing it in a body of water.

In one embodiment of the disclosure, the generally rectangular cutting board 102 has a length L1, extending between the opposing ends 110, of about 24 inches, a width W1, extending between the opposing sides 108, of between about 10 inches and about 12 inches, and a thickness T1, extending between the upper working surface 104 and the bottom surface 106, of about ½ inch. Upon reading this specification, it should be appreciated that, under appropriate circumstances, considering such issues as user preferences, design preference, structural requirements, marketing preferences, cost, etc., other cutting-board arrangements such as, for example, providing boards of alternate sizes, alternate shapes, etc., may be sufficient.

The collapsible fish filleting station 100 may include a support assembly 112 configured to support the cutting board 102 in a stable working position over the gunwale 10. The support assembly 112 may include four legs adjustably mounted to bottom surface 106 of the cutting board 102 by two transverse guide rails. More specifically, the support assembly 112 may include a first guide rail 114 mounted to the bottom surface 106 in an orientation substantially perpendicular to the opposing sides 108 (see FIG. 3). A first inboard leg 116 may be slidably engaged with the first guide rail 114, as shown. The first inboard leg 116 may be manually adjustable along the first guide rail 114 to allow engagement of the leg on an inboard surface 14 of the gunwale 10 during use, as best shown in FIG. 2. A first outboard leg 118 may also be provided. The first outboard leg 118 may be slidably engaged with the first guide rail 114 in an arrangement allowing the outboard leg 118 to be manually adjustable along the first guide rail 114 to a position of engagement on an outboard surface 16 of the gunwale 10 during use, as best shown FIG. 2.

A second guide rail 120 may be mounted to the bottom surface 106 in a parallel and spaced apart relationship with the first guide rail 114, as shown. A second inboard leg 122 may be slidably engaged with the second guide rail 120, as shown. The second inboard leg 122 may be manually adjustable along the second guide rail 120 to allow engagement of the leg on the inboard surface 14 of the gunwale 10 during use, as shown in FIG. 2. A second outboard leg 124 may be slidably engaged with the second guide rail 120, the second outboard leg 124 adjustable along the second guide rail 120 to engage the outboard surface 16 of the gunwale 10 during use.

A set of brace members may be provided to structurally reinforce the mounting arrangements of the guide rails. A first brace member 162 may be provided to structurally reinforce the mounting arrangements of the first guide rail 114 to the bottom surface 106. Similarly, a second brace member 164 may be provided to structurally reinforce the mounting arrangements of the second guide rail 120 to the bottom surface 106. Upon reading this specification, it should be appreciated that, under appropriate circumstances, considering such issues as user preferences, design preference, structural requirements, marketing preferences, cost, etc., other leg-mounting arrangements such as, for example, mounting one of the legs in a fixed position, spring-loading the legs to provide automatic clamping of the support assembly, integrally molding the rail functions within the bottom surface of the board, etc., may be sufficient.

Referring again to FIG. 2 and FIG. 3, the support assembly 112 of collapsible fish filleting station 100 may be structured and arranged to function as a clamping mechanism 138 configured to assist in firmly clamping the support assembly 112 to the gunwale 10. The clamping mechanism 138 may include a first leg retainer 140 integrated within the first guide rail 114. The first leg retainer 140 may be configured to releasably-retain the first inboard leg 116 and the first outboard leg 118 in user-selected positions of engagement with the gunwale 10. A second leg retainer 142 within the second guide rail 120 may be provided to releasably-retain the second inboard leg 122 and the second outboard leg 124 in user-selected positions of engagement with the gunwale 10. In one arrangement of the present disclosure, the actuating element of the leg retainers may include a set of linear toothed portions extending along the lengths of the guide rails. The linear toothed portions may be arranged to permit the legs to be adjusted back-and-forth by ratcheting displacement along the guide rails. In use, a user may independently move a leg along its respective rail and retain the leg by latching the leg into the toothed portion at a user-selected position. Thus, linear step-wise ratcheting adjustment of the legs, corresponding to clamped and unclamped leg positions, is possible. Those with ordinary skill in the art will now appreciate that upon reading this specification and by their understanding the art of linear ratcheting mechanisms, as described herein, methods of retaining the legs by such means will be understood by those knowledgeable in such art. It should also be noted that the disclosed device may implement alternate retention arrangements. Upon reading this specification, it should be appreciated that, under appropriate circumstances, considering such issues as user preferences, design preference, cost, available materials, technological advances, etc., other clamp-retention arrangements such as, for example, alternate clamps, latches, release levers, positional locks, autoadjusting mechanisms, friction-based clamping retainers, springs, screws, straps, mounting brackets, hook-and-loop fasteners, custom mounts sized to a specific boat model, etc., may be sufficient.

In addition, the first inboard leg 116, the first outboard leg 118, the second inboard leg 122, and the second outboard leg 124 may each comprise one or more resilient pads 144 configured to engage the gunwale 10 when the collapsible fish filleting station 100 is arranged in the clamped working position shown in FIG. 2. The resilient pads 144 may be formed from synthetic or natural rubber.

Figure 4:
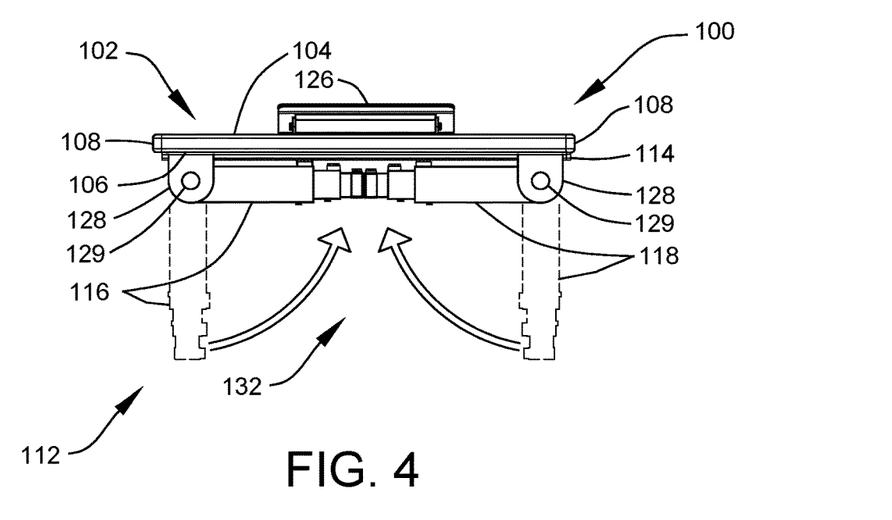
FIG. 4 is an end view of the collapsible fish filleting station of FIG. 1, illustrating adjustment of the device from a deployed orientation to a stowed orientation, according to an embodiment of the present disclosure.
Figure 5:
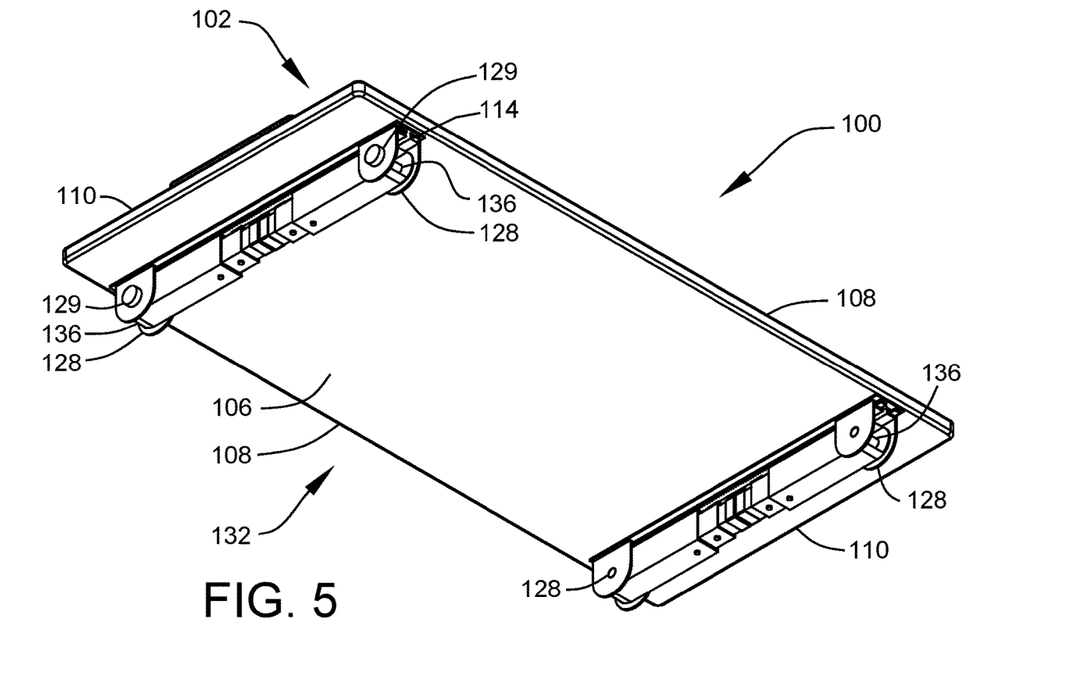
FIG. 5 is a bottom perspective view of the collapsible fish filleting station of FIG. 1, in the stowed orientation, according to an embodiment of the present disclosure.

FIG. 4 is an end view of the collapsible fish filleting station 100 of FIG. 1, illustrating the legs of the support assembly 112 pivotally adjusted from a deployed orientation 130 (see FIG. 1-3) to a stowed orientation 132, according to an embodiment of the present disclosure. FIG. 5 is a bottom perspective view of the collapsible fish filleting station of FIG. 1, showing the legs of the support assembly 112 in the stowed orientation 132.

To implement the pivoting leg feature, the first inboard leg 116, the first outboard leg 118, the second inboard leg 122, and the second outboard leg 124 each comprise a pivot hinge 128 configured to enable independent pivoting of the first inboard leg 116, the first outboard leg 118, the second inboard leg 122, and the second outboard leg 124 between the deployed orientation 130 of FIG. 2 and the stowed orientation 132 shown in FIG. 4 and FIG. 5. In the deployed orientation 130, the legs extend outwardly from the bottom surface 106 at an angle of about 90 degrees. In the stowed orientation 132, the legs are adjusted to positions extending generally parallel to the bottom surface 106, as shown. It should be noted that the collapsible fish filleting station 100 is relatively compact, easy to transport and store, when the legs of the support assembly 112 arranged in the stowed orientation 132.

The pivot hinge 128 may comprise a two-position pivot lock 136 configured to respectively lock, the first inboard leg 116, the first outboard leg 118, the second inboard leg 122 and the second outboard leg 124 in the deployed orientation 130 and the stowed orientation 132. The two-position pivot lock 136 may be manually operated by a push button 129 mechanism, as shown. Those with ordinary skill in the art will now appreciate that upon reading this specification and by their understanding the art of push-button release mechanisms, as described herein, methods of locking and unlocking pivot hinges by such means will be understood by those knowledgeable in such art.

Figure 6:
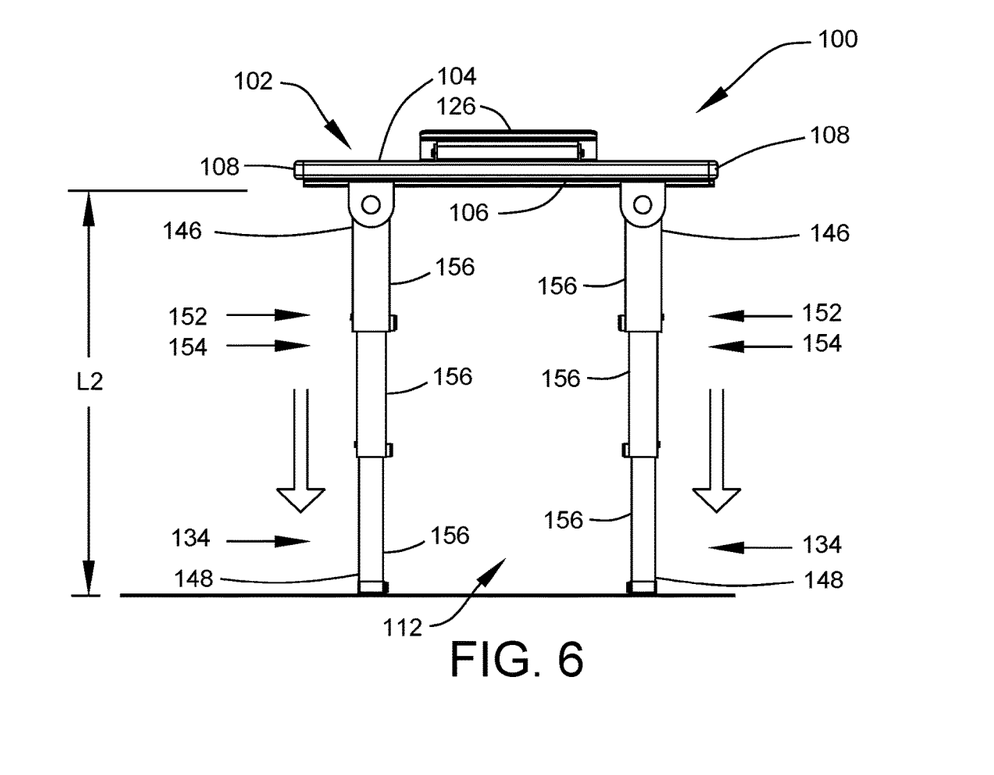
FIG. 6 is an end view of the collapsible fish filleting station of FIG. 1, illustrating an adjustment of the device, according to an embodiment of the present disclosure.
Figure 7:
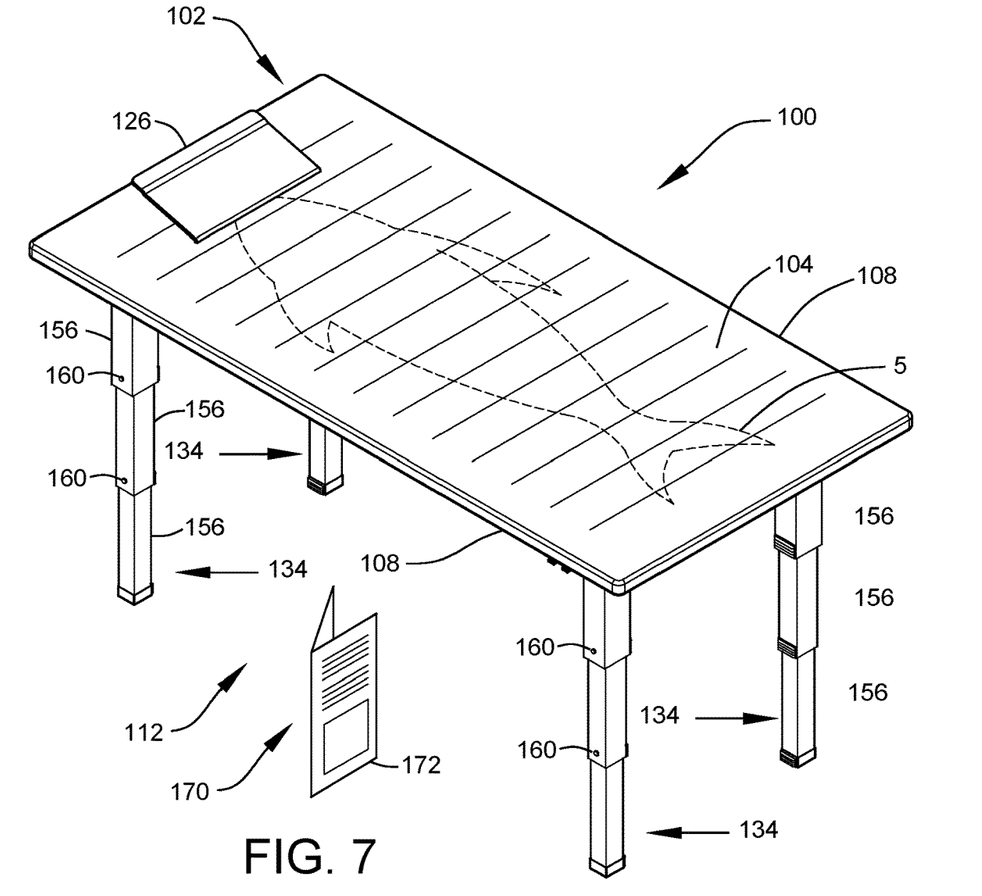
FIG. 7 is a top perspective view of the collapsible fish filleting station of FIG. 1, according to an embodiment of the present disclosure.

FIG. 6 is an end view of the collapsible fish filleting station 100 of FIG. 1, illustrating an adjustment of the device, according to an embodiment of the present disclosure. FIG. 7 is a top perspective view of the collapsible fish filleting station 100 of FIG. 1, according to an embodiment of the present disclosure. When arranged in the deployed orientation 130, the first inboard leg 116, the first outboard leg 118, the second inboard leg 122 and the second outboard leg 124 each function as a support leg 134 configured to support the cutting board 102 above a support surface 20. The first inboard leg 116, the first outboard leg 118, the second inboard leg 122, and the second outboard leg 124 may each comprise a proximal leg end 146, a distal leg end 148, and a leg length L2 extending between the proximal leg end 146 and the distal leg end 148. The first inboard leg 116, the first outboard leg 118, the second inboard leg 122, and the second outboard leg 124 may each comprise a length adjuster 152 configured to enable selective adjustment to the leg length L2. In one embodiment of the disclosure, the length adjuster 152 comprises a telescoping leg assembly 154. The telescoping leg assembly 154 may include a set of slidably engaged leg segments 156. More specifically, each leg is formed from three tubular leg segments 156 of successively smaller cross section, which are slidably engaged, as shown. The telescoping leg assembly 154 may be lockable at a selected leg length L2 using at least one releasable lock 160 configured to releasably-lock the slidably engaged leg segments 156 in a selected leg length L2. The releasable lock 160 may include manually-releasable locking pins which selectively extend through aligned receivers in the leg segments 156. The support leg assemblies thus form independently length-adjustable legs by the cooperation between the tubular leg segments 156 for providing a generally level working surface on terrain with various sloping configurations. In one embodiment of the disclosure, the leg length L2 is adjustable down to about six inches.

Figure 8:
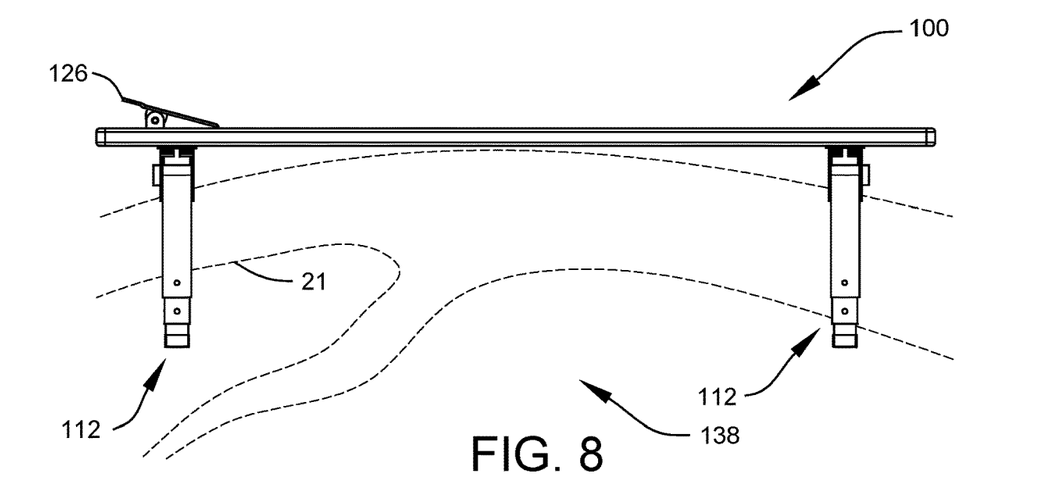
FIG. 8 is a side view of the collapsible fish filleting station of FIG. 1, in an alternate mounting configuration, according to an embodiment of the present disclosure.

FIG. 8 is a side view of the collapsible fish filleting station 100 of FIG. 1, in an alternate mounted configuration, according to an embodiment of the present disclosure. As illustrated, the legs may be adapted for securing to other support structures, such as branches 21, fences, or other structures. The adaptability of the legs allows the collapsible fish filleting station 100 to be used in other fishing situations when the user is not in a boat, such as on a riverbank or the shore of a lake. In use, the collapsible fish filleting station 100 may be oriented so that the surface of the station plank lies flat, providing a surface for filleting a fish. The fish may be lain on the surface of the station.

The collapsible fish filleting station 100 may be is constructed from one or more water-resistant materials. As noted above, the cutting board 102 may be formed from plastic, such as HDPE (high-density polyethylene). The tubular leg segments 156 may be form from plastic, aluminum, or similar rigid, lightweight, and durable materials.

Referring again to FIG. 7, the collapsible fish filleting station 100 may be arranged as a kit 170, according to an embodiment of the present disclosure. In particular, the collapsible fish filleting station 100 may further include a set of instructions 172. The instructions 172 may detail functional relationships in relation to the structure of the collapsible fish filleting station 100 such that the collapsible fish filleting station 100 can be used, maintained, or the like, in a preferred manner. Upon reading this specification, it should be appreciated that, under appropriate circumstances, considering such issues as user preferences, design preference, cost, available materials, technological advances, etc., other kit arrangements such as, for example, providing attachable accessory devices, including instructions in form of digital media, providing a storage bag, providing the device in multiple colors, etc., may be sufficient.

Figure 9:
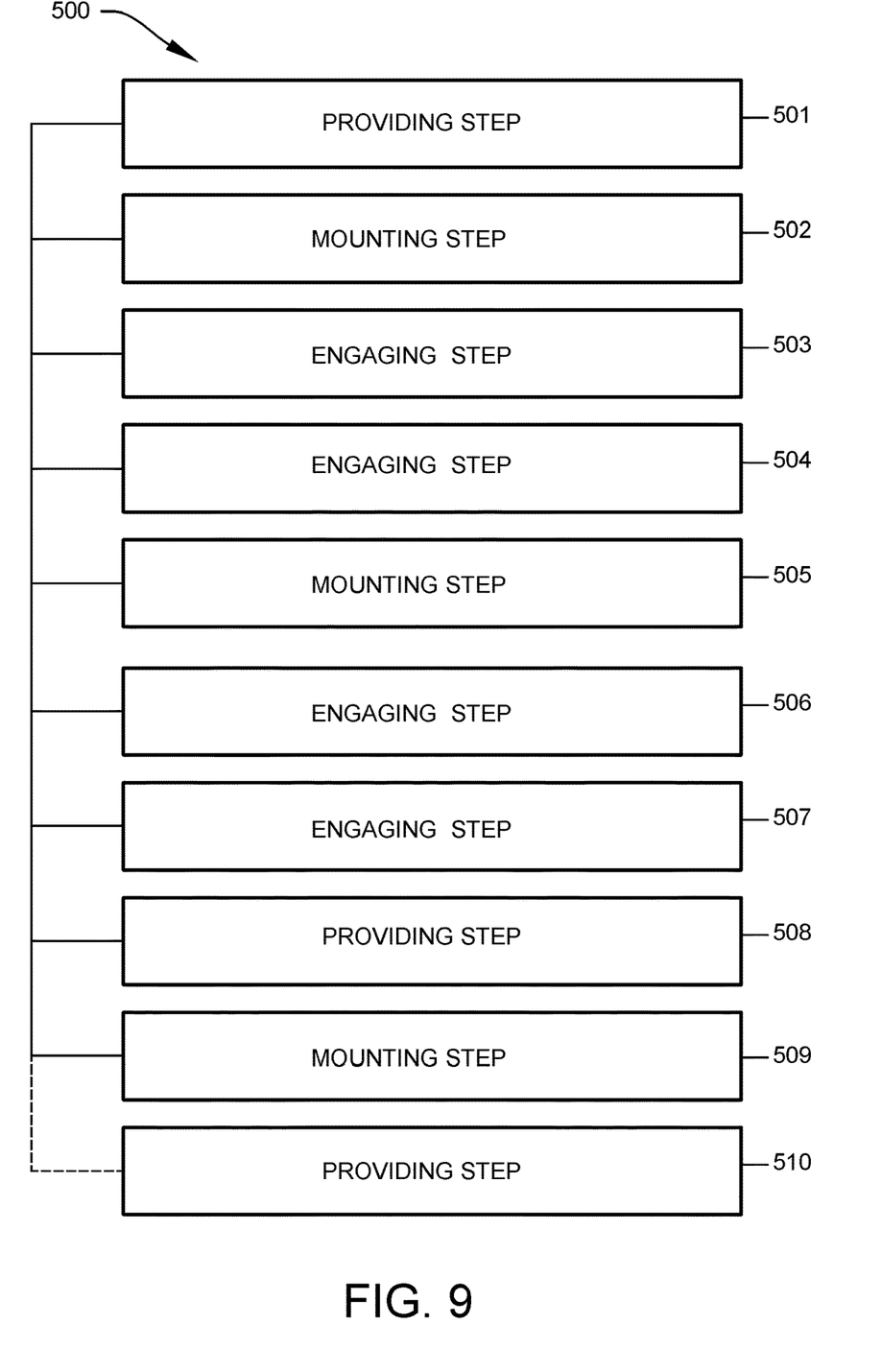
FIG. 9 is a flow diagram illustrating, a method of making the collapsible fish filleting station of FIG. 1, according to an embodiment of the present disclosure.

FIG. 9 is a flow diagram illustrating a method 500 of making a collapsible fish filleting station, according to an embodiment of the present disclosure. As illustrated, the method 500 may include the steps of: step one 501, providing a cutting board 102 comprising a rigid, substantially rectangular, panel having an upper working surface 104, a bottom surface 106, opposing sides 108, and opposing ends 110; step two 502, mounting a first guide rail 114 to the bottom surface 106 in an orientation substantially perpendicular to the opposing sides 108; step three 503, slidably engaging a first inboard leg 116 with the first guide rail 114 in an arrangement enabling the first inboard leg 116 to be adjustable along the first guide rail 114 to engage an inboard surface 14 of the gunwale 10; step four 504, slidably engaging a first outboard leg 118 with the first guide rail 114 in an arrangement enabling the first outboard leg 118 to be adjustable along the first guide rail 114 to engage an outboard surface 16 of the gunwale 10; step five 505, mounting a second guide rail 120 to the bottom surface 106 in a parallel and spaced apart relationship with the first guide rail 114; step six 506, slidably engaging a second inboard leg 122 slidably with the second guide rail 120 in an arrangement enabling the second inboard leg 122 to be adjustable along the second guide rail 120 to engage the inboard surface 14 of the gunwale 10; step seven 507, slidably engaging a second outboard leg 124 with the second guide rail 120 in an arrangement enabling the second outboard leg 124 adjustable along the second guide rail 120 to engage the outboard surface 16 of the gunwale 10; step eight 508, providing a pivot hinge 128 within each one of the first inboard leg 116, the first outboard leg 118, the second inboard leg 122, and the second outboard leg 124, the pivot hinge 128 enabling the first inboard leg 116, the first outboard leg 118, the second inboard leg 122, and the second outboard leg 124 to pivot between at least one deployed orientation 130 extending outwardly from the bottom surface 106 and a stowed orientation 132 extending generally parallel to the bottom surface 106; and step nine 509, mounting a holding clip 126 to the upper working surface 104, the holding clip 126 configured to securely hold the fish on the upper working surface 104 during such cleaning.

Even further, it provides such a method, further comprising the step ten 510 of: providing the first inboard leg 116, the first outboard leg 118, the second inboard leg 122, and the second outboard leg 124 with a leg-length adjuster 152 configured to enable selective leg-length adjustments. It should be noted that step 510 is an optional step and may not be implemented in all cases. Optional steps of method 500 are illustrated using dotted lines in FIG. 9 so as to distinguish them from the other steps of method 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for collapsible fish filleting station 100 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A collapsible fish filleting station for assisting the cleaning and filleting of a fish adjacent a gunwale of a boat, the collapsible fish filleting station comprising:
   a cutting board comprising a rigid, substantially rectangular, panel having an upper working surface, a bottom surface, opposing sides, and opposing ends;
   a support assembly configured to support the cutting board in a stable working position over the gunwale, the support assembly including
      a first guide rail mounted to the bottom surface in an orientation substantially perpendicular to the opposing sides,
      a first inboard leg slidably engaged with the first guide rail, the first inboard leg adjustable along the first guide rail to engage an inboard surface of the gunwale during use,
      a first outboard leg slidably engaged with the first guide rail, the first outboard leg adjustable along the first guide rail to engage an outboard surface of the gunwale during use,
      a second guide rail mounted to the bottom surface, the second guide rail arranged in a parallel and spaced apart relationship with the first guide rail,
      a second inboard leg slidably engaged with the second guide rail, the second inboard leg adjustable along the second guide rail to engage the inboard surface of the gunwale during use, and
      a second outboard leg slidably engaged with the second guide rail, the second outboard leg adjustable along the second guide rail to engage the outboard surface of the gunwale during use; and
   a spring-actuated holding clip mounted to the upper working surface, the spring-actuated holding clip configured to hold the fish on the upper working surface during use.

2. The collapsible fish filleting station of claim 1, wherein the first inboard leg, the first outboard leg, the second inboard leg, and the second outboard leg each comprise a pivot hinge configured to enable independent pivoting of the first inboard leg, the first outboard leg, the second inboard leg, and the second outboard leg between at least one deployed orientation extending outwardly from the bottom surface and a stowed orientation extending generally parallel to the bottom surface; and
   when arranged in the deployed position, the first inboard leg, the first outboard leg, the second inboard leg and the second outboard leg each function as a support leg configured to support the cutting board above a support surface.

3. The collapsible fish filleting station of claim 2, wherein the pivot hinge comprises a two-position pivot lock configured to respectively lock, the first inboard leg, the first outboard leg, the second inboard leg and the second outboard leg in the deployed orientation and the stowed orientation.

4. The collapsible fish filleting station of claim 2, wherein the support assembly further comprises
   a clamping mechanism configured to assist in firmly clamping the support assembly to the gunwale, the clamping mechanism including
      within the first guide rail, a first leg retainer configured to releasably-retain the first inboard leg and the first outboard leg in positions of engagement with the gunwale; and
      within the second guide rail, a second leg retainer configured to releasably-retain the second inboard leg and the second outboard leg in positions of engagement with the gunwale.

5. The collapsible fish filleting station of claim 2, wherein the first inboard leg, the first outboard leg, the second inboard leg, and the second outboard leg each comprise a resilient pad configured to engage the gunwale when the collapsible fish filleting station is arranged in the working position.

6. The collapsible fish filleting station of claim 2, wherein the first inboard leg, the first outboard leg, the second inboard leg, and the second outboard leg each comprise a proximal leg end, a distal leg end, and a leg length extending between the proximal leg end and the distal leg end; and the first inboard leg, the first outboard leg, the second inboard leg, and the second outboard leg each comprise a length adjuster configured to enable selective adjustment to the leg length.

7. The collapsible fish filleting station of claim 6, wherein the length adjuster comprises a telescoping leg assembly having a set of slidably engaged leg segments.

8. The collapsible fish filleting station of claim 7, wherein the leg length is adjustable to about six inches.

9. The collapsible fish filleting station of claim 8, wherein the telescoping leg assembly comprises at least one releasable lock configured to releasably-lock the slidably engaged leg segments in a selected leg length.

10. The collapsible fish filleting station of claim 2, wherein the upper working surface comprises a rough texture configured to assist in holding the fish on the upper working surface during the cleaning.

11. The collapsible fish filleting station of claim 2, wherein the cutting board has a length, extending between the opposing ends, of about 24 inches.

12. The collapsible fish filleting station of claim 2, wherein the cutting board has a width, extending between the opposing sides, of between about 10 inches and about 12 inches.

13. The collapsible fish filleting station of claim 2, wherein the cutting board has a thickness, extending between the upper working surface and the bottom surface, of about ½ inch.

14. The collapsible fish filleting station of claim 2, further comprising:
  a first brace member configured to structurally brace the first guide rail to the bottom surface; and
  a second brace member configured to structurally brace the second guide rail to the bottom surface.

15. The collapsible fish filleting station of claim 2, wherein the collapsible fish filleting station is constructed from at least one water-resistant material.

16. The collapsible fish filleting station of claim 2, wherein the cutting board is constructed of plastic.

17. A collapsible fish filleting station for assisting the cleaning of a fish adjacent a gunwale of a boat, the collapsible fish filleting station comprising:
  a cutting board comprising a rigid, substantially rectangular, panel having an upper working surface, a bottom surface, opposing sides, and opposing ends;
  a support assembly configured to support the cutting board in a stable working position over the gunwale, the support assembly including
    a first guide rail mounted to the bottom surface in an orientation substantially perpendicular to the opposing sides,
    a first brace member configured to structurally brace the first guide rail to the bottom surface,
    a first inboard leg slidably engaged with the first guide rail, the first inboard leg adjustable along the first guide rail to engage an inboard surface of the gunwale,
    a first outboard leg slidably engaged with the first guide rail, the first outboard leg adjustable along the first guide rail to engage an outboard surface of the gunwale,
    a second guide rail mounted to the bottom surface, the second guide rail arranged in a parallel and spaced apart relationship with the first guide rail,
    a second brace member configured to structurally brace the second guide rail to the bottom surface,
    a second inboard leg slidably engaged with the second guide rail, the second inboard leg adjustable along the second guide rail to engage the inboard surface of the gunwale, and
    a second outboard leg slidably engaged with the second guide rail, the second outboard leg adjustable along the second guide rail to engage the outboard surface of the gunwale; and
  a spring-actuated holding clip mounted to the upper working surface, the spring-actuated holding clip configured to securely hold the fish on the upper working surface during such cleaning;
wherein
  the first inboard leg, the first outboard leg, the second inboard leg, and the second outboard leg each comprise a pivot hinge configured to enable independent pivoting of the first inboard leg, the first outboard leg, the second inboard leg, and the second outboard leg between at least one deployed orientation extending outwardly from the bottom surface and a stowed orientation extending generally parallel to the bottom surface;
  the pivot hinge comprises a two-position pivot lock configured to respectively lock the first inboard leg, the first outboard leg, the second inboard leg, and the second outboard leg in the deployed orientation and the stowed orientation;
  when arranged in the deployed position, the first inboard leg, the first outboard leg, the second inboard leg and the second outboard leg each function as a support leg configured to support the cutting board above a support surface;
  the first inboard leg, the first outboard leg, the second inboard leg, and the second outboard leg each comprise a resilient pad configured to engage the gunwale when the collapsible fish filleting station is arranged in the working position;
  the first inboard leg, the first outboard leg, the second inboard leg, and the second outboard leg each comprise a proximal leg end, a distal leg end, and a leg length extending between the proximal leg end and the distal leg end;
  the first inboard leg, the first outboard leg, the second inboard leg, and the second outboard leg each comprise a length adjuster configured to enable selective adjustment to the leg length;
  the length adjuster comprises a telescoping leg assembly having a set of slidably engaged leg segments;
  the leg length is adjustable to about six inches;
  the telescoping leg assembly comprises at least one releasable lock configured to releasably-lock the slidably engaged leg segments in a selected leg length;
  the upper working surface comprises a rough texture configured to assist in holding the fish on the upper working surface during the cleaning;
  the cutting board has a length, extending between the opposing ends, of about 24 inches;

the cutting board has a width, extending between the opposing sides, of between about 10 inches and about 12 inches;

the cutting board has a thickness, extending between the upper working surface and the bottom surface, of about ½ inch; and the collapsible fish filleting station is constructed from at least one water-resistant material.

18. The collapsible fish filleting station of claim 17, further comprising set of instructions; and wherein the collapsible fish filleting station is arranged as a kit.

19. A method of making a collapsible fish filleting station removably-mountable to a gunwale of a boat, the method comprising the steps of:

providing a cutting board comprising a rigid, substantially rectangular, panel having an upper working surface, a bottom surface, opposing sides, and opposing ends;

mounting a first guide rail to the bottom surface in an orientation substantially perpendicular to the opposing sides;

slidably engaging a first inboard leg with the first guide rail in an arrangement enabling the first inboard leg to be adjustable along the first guide rail to engage an inboard surface of the gunwale;

slidably engaging a first outboard leg with the first guide rail in an arrangement enabling the first outboard leg to be adjustable along the first guide rail to engage an outboard surface of the gunwale;

mounting a second guide rail to the bottom surface in a parallel and spaced apart relationship with the first guide rail;

slidably engaging a second inboard leg slidably with the second guide rail in an arrangement enabling the second inboard leg to be adjustable along the second guide rail to engage the inboard surface of the gunwale;

slidably engaging a second outboard leg with the second guide rail in an arrangement enabling the second outboard leg adjustable along the second guide rail to engage the outboard surface of the gunwale;

providing a pivot hinge within each one of the first inboard leg, the first outboard leg, the second inboard leg, and the second outboard leg, the pivot hinge enabling the first inboard leg, the first outboard leg, the second inboard leg, and the second outboard leg to pivot between at least one deployed orientation extending outwardly from the bottom surface and a stowed orientation extending generally parallel to the bottom surface; and mounting a holding clip to the upper working surface, the holding clip configured to securely hold the fish on the upper working surface during such cleaning.

20. The method of claim 19, further comprising the steps of:

providing the first inboard leg, the first outboard leg, the second inboard leg, and the second outboard leg with a leg-length adjuster configured to enable selective leg-length adjustments.

\* \* \* \* \*